(12) United States Patent
Lauf et al.

(10) Patent No.: US 6,492,016 B1
(45) Date of Patent: Dec. 10, 2002

(54) METHOD FOR PREPARING SPHERICAL FERRITE BEADS AND USE THEREOF

(75) Inventors: Robert J. Lauf, Oak Ridge, TN (US); Kimberly K. Anderson, Knoxville, TN (US); Frederick C. Montgomery, Oak Ridge, TN (US); Jack L. Collins, Knoxville, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 0 days.

(21) Appl. No.: 09/917,356

(22) Filed: Jul. 27, 2001

(51) Int. Cl.$^7$ ............................ C01G 49/06; B22F 1/00; B32B 5/16
(52) U.S. Cl. ..................... 428/329; 428/330; 428/402; 419/23; 423/138; 423/594; 423/633; 423/635
(58) Field of Search ................................ 423/594, 635, 423/633, 138, 155, 157; 419/23; 428/329, 330, 402

(56) References Cited

U.S. PATENT DOCUMENTS

| | | | |
|---|---|---|---|
| 3,931,351 A | | 1/1976 | Hinkson et al. |
| 4,226,843 A | * | 10/1980 | Watanabe et al. ............ 423/594 |
| 4,336,242 A | * | 6/1982 | Schmidberger et al. ...... 426/594 |
| 4,397,778 A | | 8/1983 | Lloyd |
| 4,469,669 A | * | 9/1984 | Hibst .......................... 423/594 |
| 4,502,987 A | | 3/1985 | Lloyd et al. |
| 4,512,906 A | | 4/1985 | Hayakawa et al. |
| 4,623,603 A | * | 11/1986 | Iimura et al. ................ 430/108 |
| 5,051,201 A | * | 9/1991 | Mueller et al. ........... 252/62.59 |
| 5,207,973 A | | 5/1993 | Harris et al. |
| 5,306,592 A | * | 4/1994 | Saha .......................... 430/137 |
| 5,660,772 A | * | 8/1997 | Stangle et al. ................. 264/6 |
| 5,759,228 A | | 6/1998 | Sisson et al. |
| 5,821,186 A | | 10/1998 | Collins |
| 5,945,028 A | * | 8/1999 | Taguchi et al. ........... 252/62.56 |
| 6,129,903 A | | 10/2000 | Kerchner |
| 6,183,658 B1 | * | 2/2001 | Lesniak et al. ........... 252/62.56 |

OTHER PUBLICATIONS

Heinonen, O.J. et. al., "Sorption of Strontium (II) and Radio Strontium Ions on Sodium Titanate," Radiochimica Acta, 28, 93–96 (1981).
Lloyd, M.H. et. al., "A Gel Sphere Process for FBR Fuel Fabrication from Coprocessed Feed," ORNL/TM–8399, Feb. 1983.
Collins, J.L. et. al., "The Basic Chemistry Involved in the Internal–Gelation Method of Precipitating Uranium as Determined by pH Measurements," Radiochimica Acta, 42, 121–134 (1987).
Teichner, S.J., "Aerogels," ChemTech, 372–377, Jun. (1991).
J. Nicholas, "Microwave Ferrites," Ferromagnetic Materials, North Holland Publishing Co., vol. 2, 291–294 (1980).
J. Helszajn, "Nonreciprocal Microwave Junctions and Circulators," John Wiley and Sons, 291–303 (1975).

* cited by examiner

*Primary Examiner*—H. Thi Le
(74) *Attorney, Agent, or Firm*—Shelley L. Stafford

(57) ABSTRACT

The invention allows the fabrication of small, dense, highly polished spherical beads of hexagonal ferrites with selected compositions for use in nonreciprocal microwave and mm-wave devices as well as in microwave absorbent or reflective coatings, composites, and the like. A porous, generally spherical bead of hydrous iron oxide is made by a sol-gel process to form a substantially rigid bead having a generally fine crystallite size and correspondingly finely distributed internal porosity. The resulting gel bead is washed and hydrothermally reacted with a soluble alkaline earth salt (typically Ba or Sr) under conditions of elevated temperature and pressure to convert the bead into a mixed hydrous iron-alkaline earth oxide while retaining the generally spherical shape. This mixed oxide bead is then washed, dried, and calcined to produce the desired ($BaFe_{12}O_{19}$ or $SrFe_{12}O_{19}$) crystal structure. The calcined bead is then sintered to form a dense bead of the $BaFe_{12}O_{19}$ and $SrFe_{12}O_{19}$ phase suitable for polishing and incorporation into various microwave devices and components.

34 Claims, 3 Drawing Sheets

METHOD FOR PREPARING SPHERICAL FERRITE BEADS AND USE THEREOF

CROSS REFERENCE TO RELATED APPLICATIONS

The present application in part discloses material contained in a related application Ser. No. 09/917,117, filed Jul. 27, 2001, the entirety of which is incorporated herein by reference.

The invention was made with government support under contract no. DE-AC05-96OR22464 awarded by the United States Department of Energy to Lockheed Martin Energy Research Corporation; and the government has certain rights in the invention.

FIELD OF THE INVENTION

The present invention is directed to a method for preparing materials for use in various microwave components and for radar absorbent coatings and the like; more particularly to a method for preparing dense spherical beads of hexagonal ferrites and their use in nonreciprocal microwave devices.

BACKGROUND OF THE INVENTION

In the field of microwave communications, there are a variety of components generally referred to as nonreciprocal devices, such as circulators, isolators, tunable filters, and others. These passive, ideally lossless, devices are characterized by the ability to direct a microwave signal to various circuit elements depending on the direction from which the signal is coming. For example, when a transmitter and a receiver operate from a common antenna, a circulator is used to direct the output of the transmitter to the antenna while directing the incoming signal from the antenna to the receiver. Nonreciprocal devices generally rely on the phenomenon of gyromagnetic resonance in a ferrite body located within the device. The ferrite generally has an axis of symmetry (ellipsoid, needle, sphere, or disk) and is commonly a small sphere. A magnetizing field is applied to the ferrite body normal to the plane of the device, and the required magnetic field increases as the operating frequency of the device increases.

Circulators operating at microwave frequencies often employ a spherical bead of yttrium iron garnet (YIG) as the ferrite element. The YIG is grown as a single crystal (typically an inch or more in size) using a flux growth technique. The crystal is diced using a diamond saw into small cubes, which are tumbled with abrasive to round them into rough spheres. These are then polished between rotating platens (much like ball bearings). The polished bead is oriented and mounted on the end of a small polymer fiber. The degree of polish is important for minimizing losses during operation of the device. The practical upper frequency limit of a YIG oscillator is determined by the required DC magnetic field that must be applied. For example, at 96 GHz, the magnetic field would be about 30,000 gauss, which is clearly impractical to generate in, for example, a portable walkie-talkie or the like. As used herein, the term "microwave" includes frequencies from about 300 MHz to 300 GHz.

It is known in the art that a highly anisotropic material would be especially desirable for high frequency use because the internal anisotropy field of the material would reduce the necessary applied DC magnetic field. Hexagonal ferrites ($BaFe_{12}O_{19}$ and $SrFe_{12}O_{19}$) would be particularly useful in these applications if they could be formed into small highly polished spherical beads. Unfortunately, the mechanical properties of $BaFe_{12}O_{19}$ and $SrFe_{12}O_{19}$ are also very anisotropic (similar to mica), making it difficult or impossible to fabricate beads using the dicing and tumbling methods commonly employed for YIG beads. If, on the other hand, a method were available to make generally spherical $BaFe_{12}O_{19}$ and $SrFe_{12}O_{19}$ beads directly, these beads could then be polished without fracture because the polishing operation applies much lower stresses to the bead.

OBJECTS OF THE INVENTION

Accordingly, it is an object of the present invention to produce spherical beads of hexagonal ferrites for nonreciprocal microwave and mm-wave devices.

It is another object of the present invention to produce large numbers of substantially similar ferrite beads for incorporation into a polymer matrix or coating.

It is yet another object of the present invention to produce hexagonal ferrite components containing selected dopants to modify the magnetic properties.

It is a further object of the present invention to produce hexagonal ferrite components having a large grain size.

It is still yet a further object of the present invention to produce spherical beads of hexagonal ferrite components capable of being polished.

It is another object of the present invention to produce nonreciprocal microwave devices suitable for operation at mm-wave frequencies.

It is a further object of the present invention to produce hexagonal ferrite components by hydrothermal reaction of $Fe_2O_3$ with selected soluble salts, particularly alkaline earths.

Further and other objects of the present invention will become apparent from the description contained herein.

SUMMARY OF THE INVENTION

In accordance with one aspect of the present invention, the foregoing and other objects are achieved by a method for making a spherical bead of hexagonal ferrite comprising first forming a generally spherical porous bead of hydrous iron oxide by a sol-gel process. Then, reacting the bead with a soluble alkaline earth under hydrothermal conditions, then calcining the bead to form a sinterable, spherical bead of hexagonal ferrite and sintering the bead to a desired density and grain size.

In accordance with another aspect of the present invention, other objects are achieved by a microwave resonator comprising a sintered spherical bead of a hexagonal alkaline earth ferrite composition of the general formula $AFe_{12}O_{19}$ wherein A=Ba or Sr. The bead having been derived from a sol-gel process has a diameter less than about 1 mm and a grain size greater than about 0.1 $\mu$m.

In accordance with yet another aspect of the present invention, other objects are achieved by a nonreciprocal microwave device having a resonator comprising a sintered spherical bead of a hexagonal alkaline earth ferrite composition of the general formula $AFe_{12}O_{19}$ wherein A=Ba or Sr. The bead having been derived from a sol-gel process has a diameter less than about 1 mm and a grain size greater than about 0.1 $\mu$m.

In accordance with a further aspect of the present invention, other objects are achieved by a coating for selectively absorbing and reflecting microwaves comprising a polymeric matrix containing an inorganic dispersed phase. The dispersed phase contains substantially dense spherical sintered beads of a hexagonal alkaline earth ferrite composition of the general formula $AFe_{12}O_{19}$ wherein A=Ba or Sr. The beads having been derived from a sol-gel process followed by hydrothermal reaction have a final diameter less than 1 mm and a grain size greater than about 0.1 $\mu$m.

BRIEF DESCRIPTION OF THE DRAWINGS

In the drawings:

FIGS. 1 and 1a illustrate an apparatus useful in an internal gelation process for making hydrous iron oxide spherules, suitable for mass producing the inventive ferrite beads in a continuous or semicontinuous manner.

Figure 1:
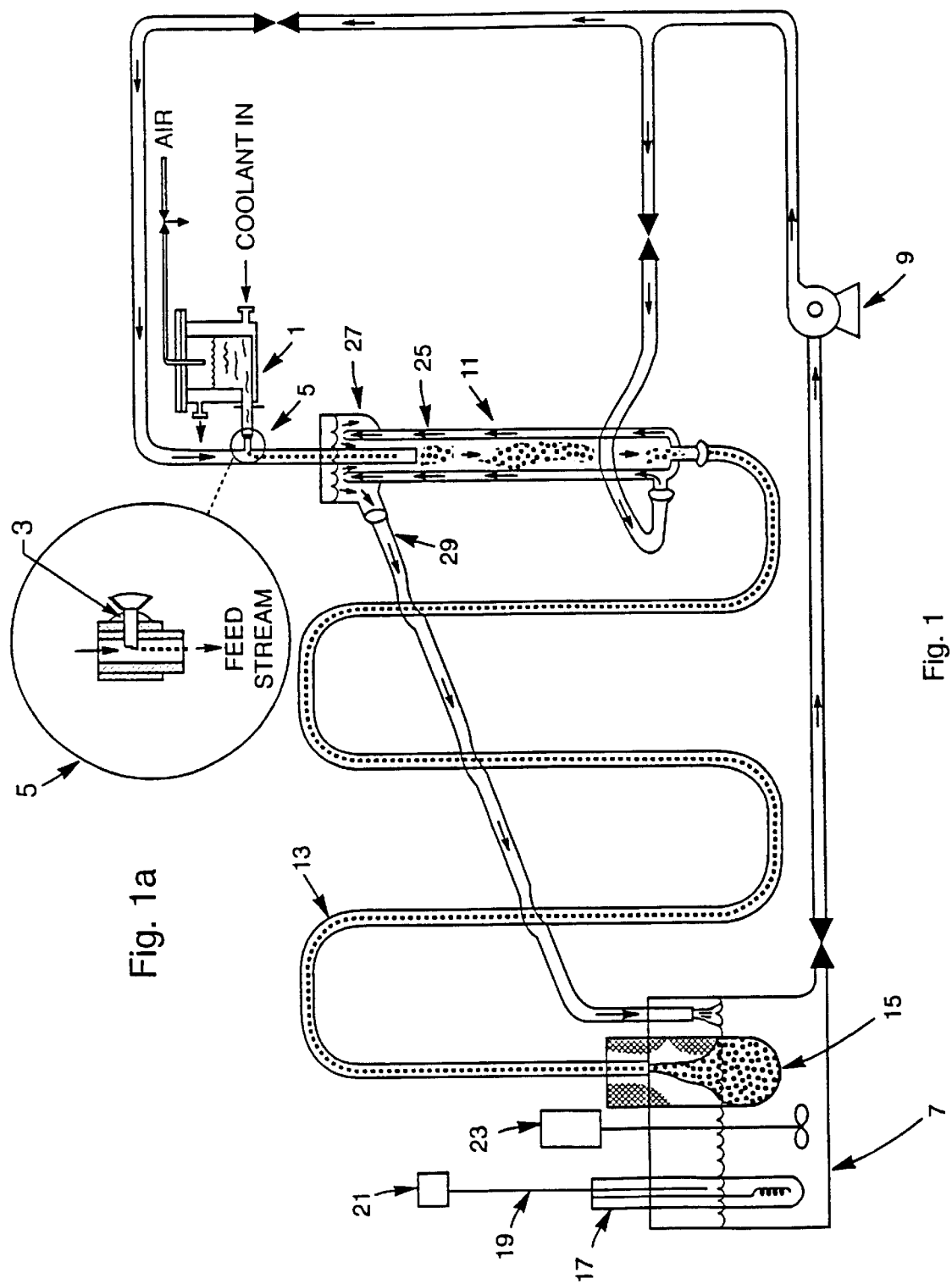

For a better understanding of the present invention, together with other and further objects, advantages and capabilities thereof, reference is made to the following disclosure and appended claims in connection with the above-described drawings.

DETAILED DESCRIPTION OF THE INVENTION

The present invention is designed to allow the fabrication of small, dense, highly polished spherical beads of hexagonal ferrites with selected compositions for use in nonreciprocal microwave and mm-wave devices as well as in microwave absorbent or reflective coatings, composites, and the like. The term "dense" as applied to the present invention is a variable term referring to the desired density of the spherical hexagonal ferrite beads as being sufficient so that the ferrite beads have adequate mechanical integrity and/or strength to effectively perform the desired task for which they were made.

A porous, generally spherical bead of hydrous iron oxide is made by a sol-gel process in which an aqueous droplet containing soluble iron is placed into a surrounding nonaqueous fluid medium, wherein surface tension causes the droplet to assume a nearly perfect spherical shape. A chemical reaction within the droplet causes the precipitation of hydrous iron oxide, followed by gelation of this oxide to form a substantially rigid bead having a generally fine crystallite size and correspondingly finely distributed internal porosity. The resulting gel bead is washed and placed into a hydrothermal reactor with a soluble alkaline earth salt (typically Ba or Sr) and reacted under conditions of elevated temperature and pressure to convert the bead into a mixed hydrous iron-alkaline earth oxide while retaining its generally spherical shape. This mixed oxide bead is then washed, dried, and calcined to produce the desired ($BaFe_{12}O_{19}$ or $SrFe_{12}O_{19}$) crystal structure. The calcined bead is then sintered to form a dense bead of the $BaFe_{12}O_{19}$ or $SrFe_{12}O_{19}$ phase suitable for polishing and incorporation into various microwave devices and components.

The preferred method for forming the spherical hydrous iron oxide gel beads from which the spherical beads of hexagonal ferrites are made is an internal gelation process. The method for making the hydrous iron oxide gel beads uses optimum formulations and conditions. These optimum formulations and conditions create an optimum process parameter window. The spherical beads are made from a broth containing an organic base, a complexing agent and an iron metal salt. The initial concentrations of these constituents in the broth and the order of mixing these chemicals are important. By controlling the parameters of the broth and the reactions, it is possible to affect the final characteristics of the gel, such as size, shape, porosity and density. The key parameters of this method for making these hydrous iron oxide gel beads include concentrations of the constituents of the broth, broth stability, reaction temperature, gelation and the structure and chemical composition of gels formed. The constituent concentrations influence the broth stability, gelation times and types of gels. In the method of the present invention.

The hydrous iron oxide gel bead is preferably made by an internal gelation process in which a chilled broth containing iron metal salt such as iron nitrate, a complexing agent such as urea, and an organic base such as hexamethylenetetramine (HMTA) is injected into a heated column of an organic medium, such as silicone oil, at 70° C. Introduction of the aqueous broth droplets into the hot, water-immiscible, medium causes decomplexation of the Fe molecules that are complexed with the complexing agent, allowing hydrolysis and gelation of the Fe to occur. The hydrolysis reaction is driven by protonation of the organic base molecules, which effectively removes H+ from the broth. The hydrolysis reaction is also driven, in some cases, by the decomposition of the protonated organic base molecules to form ammonia molecules. The rate at which these reactions take place depends upon both temperature and the concentrations of the constituents in the broth.

The pH value of the broth droplets must be at, or above, the pH value of precipitation for gelation to occur. Precipitation begins in the pH range of 2 to 3 for hydrous iron oxide. The organic medium is heated at a temperature in the range of 45° to 100° C. to obtain acceptable gelation times for hydrous iron oxide. A gelation time of <60 seconds is recommended. For operating reasons and for practical purposes, gelation times of <30 seconds are normally preferred. As the microdroplets of broth remain ungelled in the hot organic medium, the risk of their coalescing and forming larger droplets increases.

The following broth formulation and gelation temperature were used for the preparation of hydrous iron oxide microspheres by the internal gelation process using the apparatus described below and as shown in FIGS. 1 and 1a:

Fe=0.83 to 1.0 M
HMTA=1.6 to 1.9 M
Urea=1.6 to 1.9 M
Gel formation temperature=70° C.
(The gelation time is about 10 to 12 seconds).

As mentioned earlier, there are many alternative ways of making iron oxide gel spheres, including external gelation, in which a species such as ammonia is present in the surrounding medium and diffuses into the droplets to cause gelation. Another form of external gelation is the water extraction process, in which droplets of an oxide sol are injected into a fluid, an immiscible alcohol such as 2-ethyl hexanol that removes the water from the droplets, causing them to gel (see Arnold et al., U.S. Pat. No. 5,062,993, incorporated herein by reference). The most widely studied internal gelation processes in recent years involve the water hydrolysis of metal alkoxides. In these processes, solution temperature and pH are key parameters used in controlling hydrolysis and polymerization. It will be appreciated that none of these processes are suitable for making compounds such as $BaFe_{12}O_{19}$ or $SrFe_{12}O_{19}$ directly, because of the high solubility of Ba and Sr in aqueous systems. Thus, in the present invention, hydrous iron oxide gel beads formed as described above or by other conventional sol-gel approaches are then hydrothermally reacted with barium hydroxide $Ba(OH)_2$ or strontium hydroxide $Sr(OH)_2$, dried, calcined, and finally sintered at about 1200° C. to create the desired dense bead having the hexagonal ferrite crystal structure.

In the preferred embodiments, the hydrous iron oxide gel bead is made by an internal gelation process in which a chilled broth containing iron nitrate, urea, and HMTA is injected into a heated column of silicone oil at 70° C. Heating causes the aforementioned hydrolysis reactions to occur, whereby hydrous iron oxide precipitates as colloidal particles, which gel to form a rigid, porous bead during the residence time in the column. This bead is washed and placed into a sealed container where it is hydrothermally reacted with an alkaline earth (typically Ba or Sr) to form a mixed hydrous oxide while retaining its spherical shape. This mixed oxide is calcined and sintered to form a dense spherical bead of the desired phase (generally $BaFe_{12}O_{19}$ or $SrFe_{12}O_{19}$).

FIG. 1 and FIG. 1a illustrate one embodiment of an apparatus that is suitable for carrying out the gelation step of the present invention. In this embodiment, the chilled broth is injected through a needle 3 into a column 11 of silicone oil that is continuously recirculating from a heated reservoir 7. The broth. droplets gel during their residence time in a downstream transport line 13 and are collected in a basket 15 for washing.

FIG. 1 illustrates a chilled broth is first formed and then added to the chilled apparatus broth pot 1 and processed through the gel-forming or spherule-forming apparatus. The system also includes a needle 3 that is used in a two-fluid nozzle 5 for placing broth droplets in the hot organic medium where they gel. The apparatus also includes a reservoir 7 for heating the organic medium, a pump 9 for circulating the organic medium, a chilled broth pot 1, a two-fluid nozzle system 5 for controlling the size of the broth droplets, a glass gelation column (forming column) 11, a downstream transport line 13 to provide a residence time for the gel spherules to hydrolyze and solidify, and a product collector 15 for collecting and aging the gelled spherules and also for separating the organic medium from the gelled spherules.

The organic medium reservoir 7 may comprise a stainless steel open-top rectangular container. One or more heating blades 17 may be positioned at the rear of the reservoir to heat the organic medium. A thermocouple 19 may be positioned in the basket at the bottom and near the front of the reservoir and is connected to a temperature controller 21 that is used to control the organic medium temperature. A stirrer 23 with its shaft positioned away from the heating blade or blades 17 (other blades not shown) and its impeller located near the bottom of the reservoir is used to mix and maintain the organic medium at a desired temperature. Occupying most of the front space in the reservoir 7 is a large removable basket 15 that serves as a backup to prevent any spilled gelled spherules from being pumped out of the reservoir to the circulating pump.

The pump 9 is used to pump the hot organic medium from the reservoir 7 through a line to the vertically positioned glass gelation column 11. The flow from the pump 9 is divided into two streams that are controlled by manual valves. The flow of one of the streams may be routed to a position above the center of the top of the gelation column 11. Vertically attached to this line may be a tube whose outlet end is inserted into the entrance of the gelation column. The tube is part of the two-fluid nozzle 5 system that is used to control the size of the droplets. The other hot organic medium stream from the pump 9 is routed to a fitting at the bottom of the gelation column 11 and flows up through a shell 25 that surrounds the gelation column 11. The hot organic medium over-flows at the top of the column, first, into the gelation column 11 and, then, into an overflow cup 27. A large tube 29 is connected to a fitting from the overflow cup 27 to route any overflow back to the hot organic medium reservoir 7. During operation, the flow of organic medium from the heating shell 25 is normally adjusted to provide only a slight overflow.

As shown in FIG. 1a, the two-fluid nozzle system 5 is very simple. It comprises a needle 3 that is perpendicularly inserted through the wall of the tube to the midpoint of the hot organic medium carrier stream and is positioned approximately 5 inches above the entrance to the gelation column 11. The chilled broth is jetted into the laminar flowing oil by air pressurizing the broth pot 1, forcing the broth out a tube at the bottom of the broth pot through a short plastic line that is connected to the needle 3. The size of the droplets formed is dependent upon the gauge of the needle used and the flow rates of the hot organic medium and of the broth.

The hot organic medium carrying the droplets from the two-fluid nozzle tube 5 flows directly into the central concurrent flow tube of the jacketed gelation column 11 where it is desirable for the droplets to begin to gel. On exiting the gelation column 11, the gelling spheres flow into a serpentine transport line 13. This line is long enough (about 8-ft.) to allow the gelling spherules to have a total residence time of 25 to 35 seconds to the collection basket 15. The transport time also includes the time the spherules are passing through the gelation column. The gelation column and serpentine transport system are designed to be a siphoning system with a gravity head of about 60-cm for oil temperatures in the range of about 45° to 100° C.

The collection basket 15 is positioned above the hot organic medium reservoir 7, and is used to collect and separate the gel spherules from the hot organic medium as they exit the serpentine transport line 13. The collected gel spherules are aged by lowering the collection basket 15 into the reservoir 7 for between 15 and 30 minutes, preferably 20 minutes. After aging, the bulk of the organic medium is drained from the gel spherules and the residual organic medium is removed by a series of washing steps to remove the reaction impurities.

Another basket of similar design may also be positioned above the hot oil reservoir to filter the return organic medium from a tube, which is connected to the overflow drain line at the top of the gelation column.

Conversion of the hydrous iron oxide gel beads is carried out in a Parr reactor by heating the beads in a solution of barium or strontium hydroxide at 200° C. for several hours followed by calcining in air to 1200° C.

Figure 2:
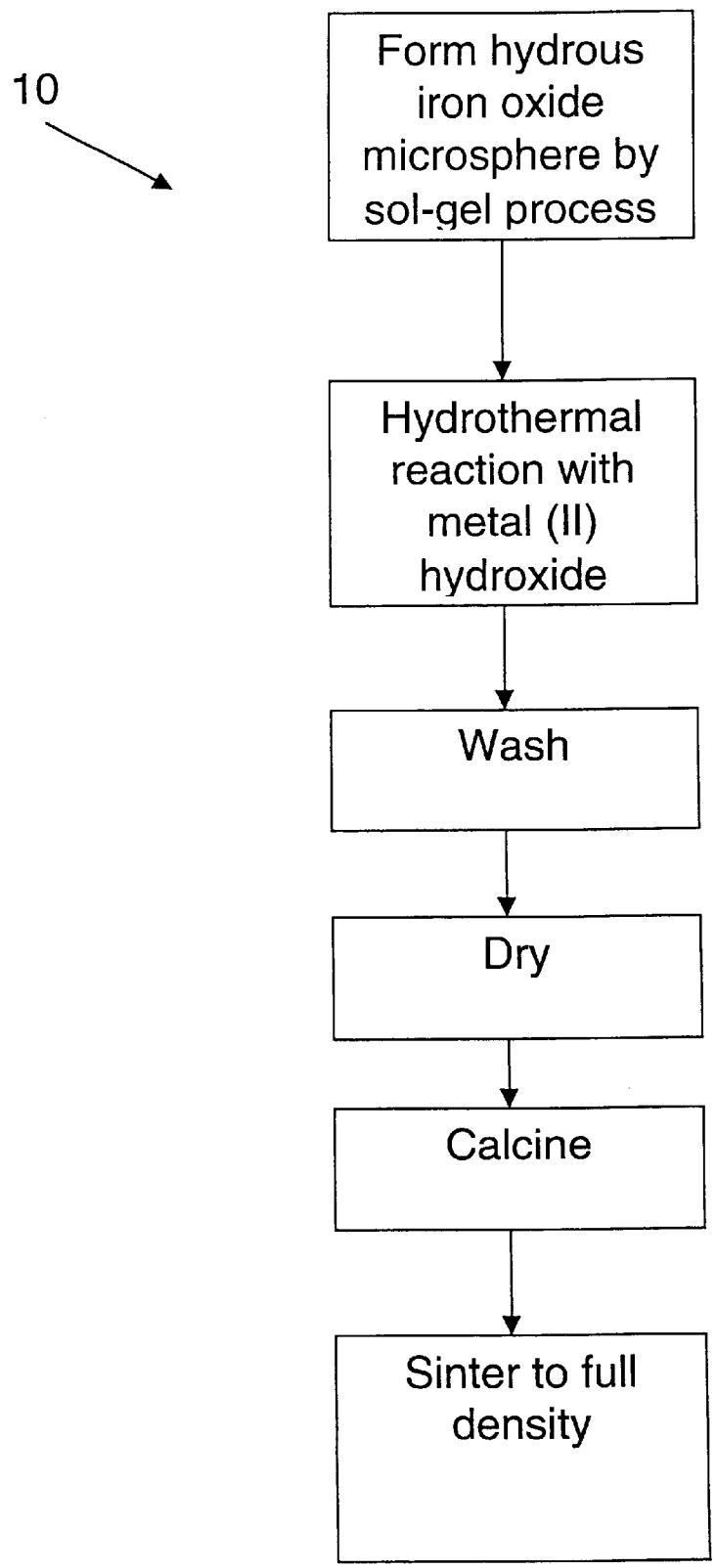
FIG. 2 is a schematic diagram of a preferred embodiment of the chemical process used to make the spherical beads of hexagonal ferrite of the present invention.

FIG. 2 illustrates schematically the basic chemical flow chart 10 of the present invention. Applicable gelation processes are internal gelation, external gelation, and water extraction, although internal gelation is the most preferable process.

As will be illustrated in the following examples, the aforedescribed method can be carried out in a wide range of modifications to selectively synthesize beads having selected compositions and therefore selected magnetic or dielectric properties.

EXAMPLE 1

The apparatus shown in FIGS. 1 and 1a was used to make hydrous iron oxide gel beads by the internal gelation process. A broth containing 110 mL of 2.507 M iron nitrate, 165 mL HMTA/urea (1.6 M HMTA and 1.6 M urea) was chilled and placed into the broth pot 1. The broth was injected into the silicone oil through a 21-gauge needle 3, forming droplets about 300 $\mu$m in diameter. Residence time of the droplets in the downstream transport line 13 was about 30 seconds, after which the resulting gel spheres had sufficient rigidity to collect them in the basket 15. The gel spheres were allowed to age for about 15 minutes in the basket, after which they were washed in trichloroethylene (TCE) and then stored in deionized water.

It will be clear to those skilled in the art that the size of the gel beads can be controlled by the diameter of the nozzle, shown in FIG. 1a, used to inject the broth, as well as by other commonly known techniques such as ultrasonic agitation or the application of electric fields (U.S. Pat. No. 5,759,228 "Nozzle for Electric Dispersion Reactor," issued to W. G. Sisson et al.). It will further be clear that the density of the gel beads (i.e., the volume fraction solids) can be controlled by the concentration of Fe in the feed broth and that the volume fraction solids will control the amount of shrinkage that the beads undergo during sintering. It will thus be appreciated that beads of virtually any desired size (from tens to thousands of $\mu$m) can be made by the process described.

EXAMPLE 2

The hydrous iron oxide gel beads from the previous Example 1 were about 300 $\mu$m. These beads were suspended in a stainless steel mesh basket and placed into a Parr reactor in a solution of 4 M Ba (OH)$_2$. The beads were allowed to equilibrate overnight in this solution. Then the reactor was heated to 200° C. and pressurized to prevent boiling of the solution and the sample was held for 4 hours. Upon removal, the beads had lost their integrity and formed a gelatinous mass. Based on this result, a lower concentration of Ba hydroxide was indicated.

EXAMPLE 3

The hydrous iron oxide gel beads from Example 1 were about 300 $\mu$m. These beads were suspended in a stainless steel mesh basket and placed into a Parr reactor in a solution of 0.5 M Ba(OH)$_2$. The beads were allowed to equilibrate overnight in this solution. Then the reactor was heated to 200° C. and pressurized to prevent boiling of the solution and the sample was held for 4 hours. Upon removal, the beads were intact and had changed color (red to dark brown). The beads were air dried and a small sample was heated in air at 10° C./min to 1200° C. The beads, which were still intact, were then crushed and examined by X-ray diffraction, which determined that they were substantially single-phase BaFe$_{12}$O$_{19}$.

EXAMPLE 4

Hydrous iron oxide gel beads prepared according to Example 1 were suspended in a stainless steel mesh basket and placed into a Parr reactor in a solution of 0.5 M Sr(OH)$_2$. As before, the beads were allowed to equilibrate in this solution overnight. The reactor was heated to 200° C. and the sample was held for 4 hours. Upon removal, the beads were intact and had changed color (red to black). The beads were dried in air and then heated at 10° C./min to 1200° C. The beads, which were still intact, were then crushed and examined by X-ray diffraction, which determined that they were substantially single-phase SrFe$_{12}$O$_{19}$. SEM examination indicated that the beads were substantially dense.

It will be understood that the inventive process may be further modified by the addition of various dopants. As described by J. Nicholas ("Microwave Ferrites" in *Ferromagnetic Materials,* Vol. 2, pp. 291–4, North Holland Publishing Co., 1980, incorporated herein by reference) many useful compositions can be derived from the basic hexagonal ferrite composition by partial substitutions of Al$^{+3}$, Ga$^{+3}$ or Cr$^{+3}$ for Fe$^{+3}$ ions, which causes the magnetization to increase and the magnetocrystalline anisotropy field to increase; by substitution of Ti$^{+4}$Me$^{+2}$ or Ge$^{+4}$Me$^{+2}$ (with Me$^{+2}$=Co, Ni, Zn, etc.), which causes both the magnetization and the anisotropy field to decrease; or by combined substitutions of both of the above types, which leads to better stability of the anisotropy field with temperature. The substitution of Al or transition metals for the Fe can in most cases be accomplished by adding the selected metal ions to the feed broth in the desired ratios.

It will be appreciated that Applicant's material and method may be employed for a very wide variety of applications. These include nonreciprocal microwave and mm-wave devices such as circulators, isolators, and tunable filters that would employ a single polished bead. In these applications, it is preferred that the bead be substantially fully dense in order to minimize microwave losses. It is also preferred that the grain size be fairly large in order to obtain properties that approach those of a single crystal. Skilled practitioners will understand that the evolution of particular microstructures may be manipulated by the sintering profile (time, temperature, atmosphere, heating rates, etc.) in combination with the possible fluxing effects of dopant species.

The inventive beads could also be dispersed in a composite or coating for a variety of purposes such as selective reflection or attenuation of microwave signals. The beads may be substantially monosized and a single composition, or they may have a selected range of diameters and compositions, whereby the microwave reflectivity or absorption may be tailored over a wide range for particular applications and frequencies. For microwave absorbent materials, it might be desirable to sinter the beads to less than full density in order to increase their loss tangent or otherwise modify their dielectric properties. It will be understood that the aforementioned coating might also contain various other inorganic particles such as pigments, metals, dielectrics and the like in order to further modify its properties.

Figure 3:
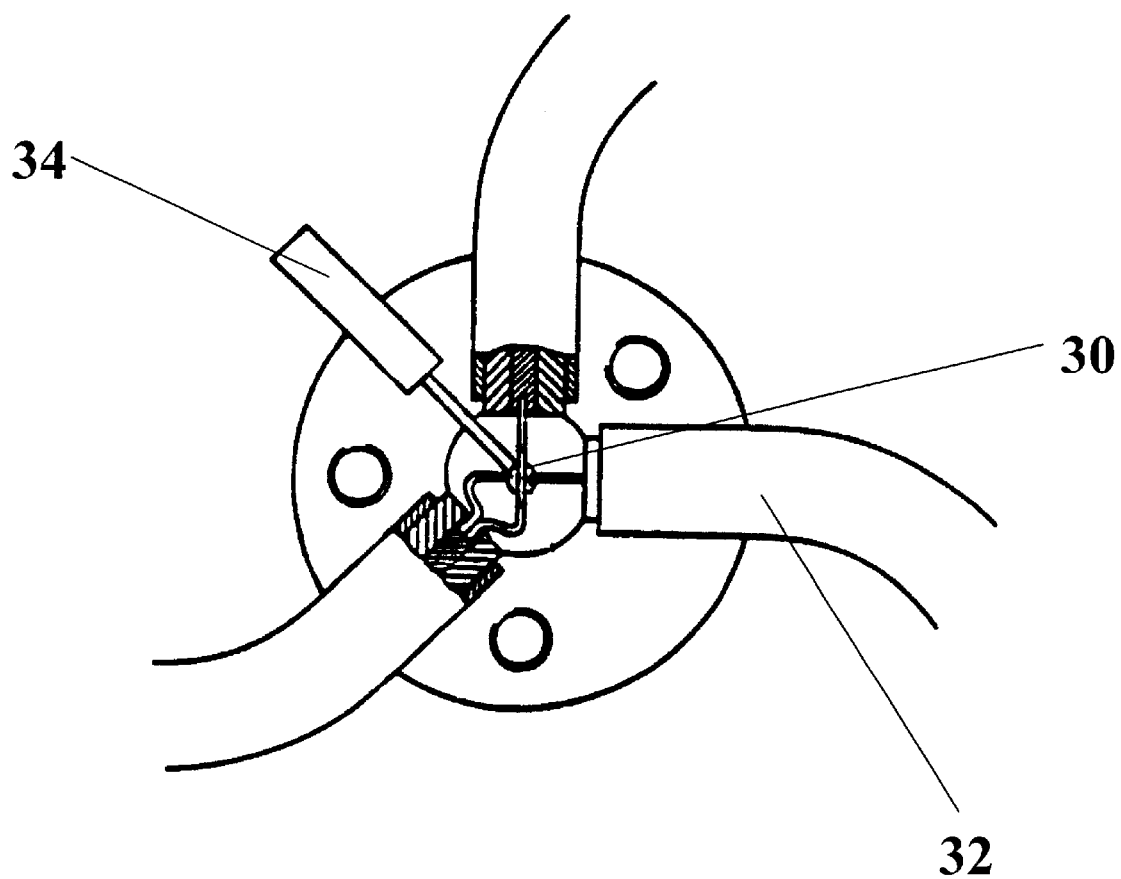
FIG. 3 is an illustration of one nonreciprocal microwave device employing the ferrite bead of the present invention.

FIG. 3 is an example of a nonreciprocal microwave device utilizing the spherical beads of hexagonal ferrites made by the method of the present invention. FIG. 3 shows a 3-port asymmetric circulator using a single gyrator network utilizing a centrally-positioned spherical bead of hexagonal ferrite 30, described by J. Helszain, *Non-Reciprocal Microwave Junctions and Circulators,* John Wiley & Sons, pp. 291–303, incorporated herein by reference. FIG. 3 also shows three O.S.S.M. semirigid cables 32 included within the semiloops structure and a cross-linked polystyrene rod 34.

While several preferred embodiments have been shown and described, and several examples have been specifically delineated, it will be understood that such descriptions are not intended to limit the disclosure, but rather it is intended to cover all modifications and alternate methods falling within the spirit and the scope of the invention as defined in the appended claims or their equivalents.

What is claimed is:

1. A method for making a spherical bead of hexagonal ferrite comprising the following steps:
    a. forming a generally spherical porous bead of hydrous iron oxide by a sol-gel process;

b. reacting said bead with a soluble alkaline earth under hydrothermal conditions;

c. calcining said bead to form a sinterable, spherical bead of hexagonal ferrite; and, d. sintering said bead to a desired density and a desired grain size.

2. The method of claim 1 further including the step of polishing said sintered bead.

3. The method of claim 1 wherein said alkaline earth is Ba or Sr.

4. The method of claim 1 wherein said sol-gel process is selected from the group consisting of internal gelation, external gelation, and water extraction processes.

5. The method of claim 4 wherein said internal gelation process comprises the precipitation and gelation of hydrous iron oxide from an aqueous broth containing at least one soluble iron species, urea, and hexamethylenetetramine.

6. The method of claim 5 wherein said broth further contains additional metal species in partial substitution for said iron.

7. The method of claim 6 wherein said additional metal species comprises at least one metal selected from the group consisting of Al, Ga, Ti, Ge, Mn, Zn, Cr, and Ni.

8. The method of claim 1 wherein said hydrothermal reaction is carried out at a temperature of at least 100° C. and an alkaline earth concentration of about 0.1 to 5 M.

9. The method of claim 1 wherein said sintering is carried out at a temperature of about 1000° to 1300° C. to substantially full density.

10. A microwave resonator comprising a sintered spherical bead of a hexagonal alkaline earth ferrite composition of the general formula $AFe_{12}O_{19}$, wherein A=Ba or Sr, said bead derived from a sol-gel process and having a diameter less than about 1 mm and a gram size greater than about 0.1 $\mu$m.

11. The article of claim 10 wherein said sintered bead has a diameter between about 50 $\mu$m and about 1 mm.

12. The article of claim 10 wherein said sol-gel process is selected from the group consisting of internal gelation, external gelation, and water extraction processes.

13. The article of claim 12 wherein said internal gelation process comprises the precipitation and gelation of hydrous iron oxide from an aqueous broth containing at least one soluble iron species, urea, and hexamethylenetetramine.

14. The article of claim 13 wherein said broth further contains additional metal species in partial substitution for said iron.

15. The article of claim 14 wherein said additional metal species comprises at least one metal selected from the group consisting of Al, Ga, Ti, Ge, Mn, Zn, Cr, and Ni.

16. The article of claim 10 wherein said bead is sintered in air at a temperature of about 1000° to 1300° C. to substantially full density.

17. A nonreciprocal microwave device having a resonator comprising a sintered spherical bead of a hexagonal alkaline earth ferrite composition of the general formula $AFe_{12}O_{19}$, wherein A=Ba or Sr, said bead derived from a sol-gel process and having a diameter less than about 1 mm and a grain size greater than about 0.1 $\mu$m.

18. The article of claim 17 wherein said sintered bead has a diameter between about 50 $\mu$m and about 1 mm.

19. The article of claim 17 wherein said sol-gel process is selected from the group consisting of internal gelation, external gelation, and water extraction processes.

20. The article of claim 19 wherein said internal gelation process comprises the precipitation and gelation of hydrous iron oxide from an aqueous broth containing at least one soluble iron species, urea, and hexamethylenetetramine.

21. The article of claim 20 wherein said broth further contains additional metal species in partial substitution for said iron.

22. The article of claim 21 wherein said additional metal species comprises at least one metal selected from the group consisting of Al, Ga, Ti, Ge, Mn, Zn, Cr, and Ni.

23. The article of claim 17 wherein said bead is sintered in air at a temperature of about 1000° to 1300° C. to substantially full density.

24. A coating for selectively absorbing and reflecting microwaves, comprising a polymeric matrix containing an inorganic dispersed phase, said dispersed phase containing substantially dense spherical sintered beads of a hexagonal alkaline earth ferrite composition of the general formula $AFe_{12}O_{19}$, wherein A=Ba or Sr, said beads derived from a sol-gel process followed by hydrothermal reaction and having a final diameter less than about 1 mm and a grain size greater than about 0.1 $\mu$m.

25. The coating of claim 24 wherein said sintered beads have a diameter between about 50 $\mu$m and about 1 mm.

26. The coating of claim 25 wherein said beads are substantially monosized.

27. The coating of claim 25 wherein said beads have a selected range of diameters whereby the microwave reflectivity of said coating may be controlled over a selected frequency range.

28. The coating of claim 24 wherein said sol-gel process is selected from the group consisting of internal gelation, external gelation, and water extraction processes.

29. The coating of claim 28 wherein said internal gelation process comprises the precipitation and gelation of hydrous iron oxide from an aqueous broth containing at least one soluble iron species, urea, and hexamethylenetetramine.

30. The coating of claim 29 wherein said broth further contains additional metal species in partial substitution for said iron.

31. The coating of claim 30 wherein said additional metal species comprises at least one metal selected from the group consisting of Al, Ga, Ti, Ge, Mn, Zn, Cr, and Ni.

32. The coating of claim 24 wherein said beads are sintered in air at a temperature of about 1000° to 1300° C.

33. The coating of claim 24 wherein all of said beads have substantially the same composition.

34. The coating of claim 24 wherein said beads are selected from at least two batches having substantially different compositions, whereby the microwave properties of said coating are controlled over a desired range.

* * * * *